United States Patent
Kim

(10) Patent No.: US 8,444,738 B2
(45) Date of Patent: May 21, 2013

(54) FILTER DEVICE FOR REDUCING AUTOMOBILE EXHAUST FUME

(75) Inventor: Hyun Tae Kim, Seoul (KR)

(73) Assignee: Alantum Corporation, Seongnam (KR)

( * ) Notice: Subject to any disclaimer, the term of this patent is extended or adjusted under 35 U.S.C. 154(b) by 549 days.

(21) Appl. No.: 12/452,545

(22) PCT Filed: Jul. 18, 2008

(86) PCT No.: PCT/KR2008/004219
§ 371 (c)(1),
(2), (4) Date: Jan. 7, 2010

(87) PCT Pub. No.: WO2010/008108
PCT Pub. Date: Jan. 21, 2010

(65) Prior Publication Data
US 2010/0132343 A1   Jun. 3, 2010

(51) Int. Cl.
| B01D 39/06 | (2006.01) |
| B01D 24/00 | (2006.01) |
| B01D 39/14 | (2006.01) |
| B01D 50/00 | (2006.01) |
| F01N 3/00 | (2006.01) |

(52) U.S. Cl.
USPC .......... 55/523; 55/522; 55/524; 422/169; 422/170; 422/171; 422/172; 422/177; 422/178; 422/179; 422/180; 422/181; 422/182; 60/297

(58) Field of Classification Search
USPC 55/522–524; 422/169–172, 177–182; 60/297
See application file for complete search history.

(56) References Cited

U.S. PATENT DOCUMENTS

| 1,898,027 A | * | 2/1933 | Winslow | 55/486 |
| 3,105,752 A | * | 10/1963 | Bruce | 55/302 |
| 3,397,793 A | * | 8/1968 | MacDonnell | 210/457 |

(Continued)

FOREIGN PATENT DOCUMENTS

| KR | 10-2007-0000043 | 1/2007 |
| KR | 10-0788405 | 1/2008 |
| KR | 10-0804142 | 2/2008 |
| KR | 10-0822450 | 4/2008 |

OTHER PUBLICATIONS

Gwon et al., English translation of Filter Structure of Distributed Flow for Efficiency Improvement of the Metal Foam Filter for Vehicle, Korea, Feb. 19, 2008.*

(Continued)

*Primary Examiner* — Amber Orlando
(74) *Attorney, Agent, or Firm* — Lexyoume IP Meister, PLLC.

(57) ABSTRACT

Disclosed herein is a filter device for reducing automobile exhaust fume. The filter device includes a case, a front flange mounted inside the case, a rear flange mounted inside the case, and a filter member mounted between the front and rear flanged. The case includes an inlet port, a porous tube and an exhaust port. The filter member includes a laminated-type or rolled-up type metallic foam filter mounted between the front and rear flanges, and a jacket wrapped around the metallic foam filter. The exhaust gas that flows inside the porous tube passes through the metallic foam filter. The jacket is formed in a network form to maintain the shape of the metallic foam filter and provide durability thereto. The jacket is formed with a rectangular vent hole. The jacket holds the metallic foam filter such that the shape, construction and position of the metallic foam filter can be maintained.

6 Claims, 6 Drawing Sheets

U.S. PATENT DOCUMENTS

| | | | | |
|---|---|---|---|---|
| 3,479,145 A * | 11/1969 | Lentz | | 422/181 |
| 3,505,794 A * | 4/1970 | Nutter et al. | | 55/487 |
| 3,685,972 A * | 8/1972 | Palma et al. | | 422/179 |
| 3,716,436 A * | 2/1973 | Pall et al. | | 156/218 |
| 3,754,619 A * | 8/1973 | McCormick | | 181/248 |
| 3,874,854 A * | 4/1975 | Hunter, Jr. | | 422/175 |
| 3,920,404 A * | 11/1975 | Gandhi et al. | | 422/179 |
| 3,989,471 A * | 11/1976 | Nowak | | 422/179 |
| 4,094,644 A * | 6/1978 | Wagner | | 422/181 |
| 4,096,691 A * | 6/1978 | Nohira et al. | | 60/295 |
| 4,208,374 A * | 6/1980 | Foster | | 422/179 |
| 4,318,720 A * | 3/1982 | Hoggatt | | 96/135 |
| 4,385,032 A * | 5/1983 | Fratzer et al. | | 422/176 |
| 4,487,618 A * | 12/1984 | Mann | | 55/323 |
| 4,632,682 A * | 12/1986 | Erdmannsdorfer | | 55/498 |
| 4,829,766 A * | 5/1989 | Henkel | | 60/303 |
| 4,830,833 A * | 5/1989 | Shaff | | 422/172 |
| 4,841,728 A * | 6/1989 | Jean et al. | | 60/312 |
| 4,848,513 A * | 7/1989 | Csaszar | | 181/265 |
| 4,969,328 A * | 11/1990 | Kammel | | 60/275 |
| 4,971,612 A * | 11/1990 | Loughran | | 96/387 |
| 5,039,413 A * | 8/1991 | Harwood et al. | | 210/457 |
| 5,223,009 A * | 6/1993 | Schuster et al. | | 96/146 |
| 5,246,472 A * | 9/1993 | Herman et al. | | 96/380 |
| 5,250,094 A * | 10/1993 | Chung et al. | | 55/523 |
| 5,457,945 A * | 10/1995 | Adiletta | | 55/301 |
| 5,500,029 A * | 3/1996 | Zievers et al. | | 55/485 |
| 5,571,298 A * | 11/1996 | Buck | | 55/282.3 |
| 5,685,985 A * | 11/1997 | Brown et al. | | 210/450 |
| 5,797,973 A * | 8/1998 | Dudrey et al. | | 55/372 |
| 5,801,344 A * | 9/1998 | Herold | | 181/272 |
| 5,820,833 A * | 10/1998 | Kawamura | | 422/174 |
| 5,846,495 A * | 12/1998 | Whittenberger et al. | | 422/180 |
| 5,873,918 A * | 2/1999 | Dillman et al. | | 55/282.3 |
| 5,897,676 A * | 4/1999 | Engel et al. | | 55/498 |
| 6,329,625 B1 * | 12/2001 | Quick et al. | | 219/85.13 |
| 6,467,570 B1 * | 10/2002 | Herold | | 181/231 |
| 6,468,333 B2 * | 10/2002 | Spiegelman et al. | | 96/135 |
| 6,770,110 B1 * | 8/2004 | Seifert et al. | | 55/498 |
| 7,070,642 B2 * | 7/2006 | Scott et al. | | 55/498 |
| 7,291,197 B2 * | 11/2007 | Costura et al. | | 55/497 |
| 7,311,208 B2 * | 12/2007 | Brown et al. | | 210/438 |
| 7,320,723 B2 * | 1/2008 | Sewell, Sr. | | 55/512 |
| 7,473,288 B2 * | 1/2009 | Toyoda et al. | | 55/282.3 |
| 7,611,561 B2 * | 11/2009 | Hill et al. | | 55/523 |
| 7,758,665 B2 * | 7/2010 | Ziebold et al. | | 55/486 |
| 7,935,163 B2 * | 5/2011 | Samaras et al. | | 55/385.3 |
| 7,981,187 B2 * | 7/2011 | Gieseke et al. | | 55/498 |
| 8,029,592 B2 * | 10/2011 | Schramm et al. | | 55/523 |
| 8,038,756 B2 * | 10/2011 | Iddings et al. | | 55/502 |
| 8,066,791 B2 * | 11/2011 | Baseotto et al. | | 55/503 |
| 2002/0141910 A1 * | 10/2002 | Adiletta | | 422/171 |
| 2009/0165651 A1 * | 7/2009 | Burgess et al. | | 95/284 |
| 2009/0320425 A1 * | 12/2009 | Dworatzek et al. | | 55/504 |

OTHER PUBLICATIONS

Hyeon, English translation of Filter for Eliminating Particulate Matters in a Diesel Engine, Korea Jan. 2, 2007.*

* cited by examiner

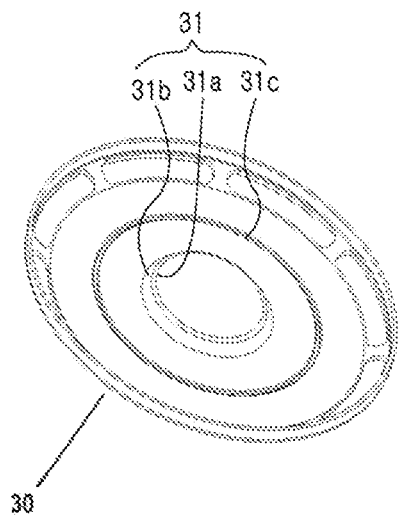
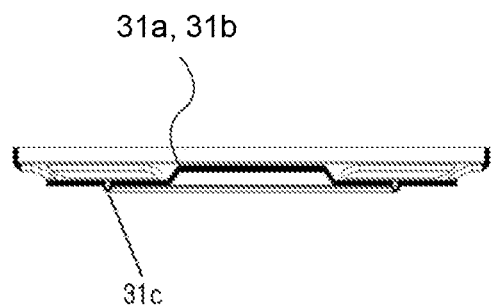
Figure 5
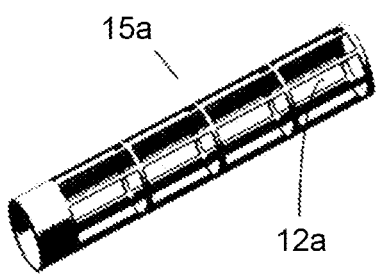
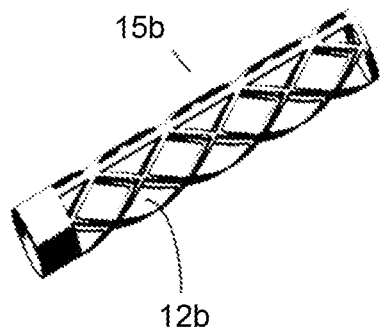
Figure 6
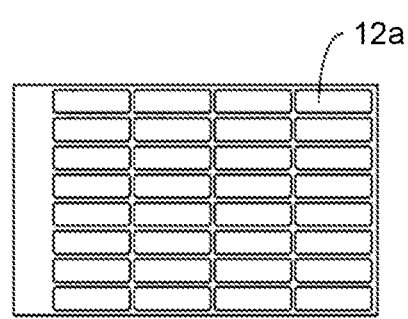
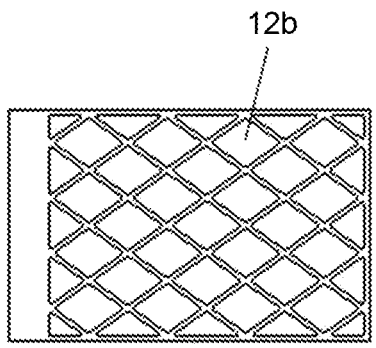

FILTER DEVICE FOR REDUCING AUTOMOBILE EXHAUST FUME

TECHNICAL FIELD

The present invention relates to a filter device for reducing automobile exhaust fume, in which one or more partitions are used to expand a flow length of exhaust gas while not thickening the thickness of a filter and the exhaust gas passes a multi-layered filter to increase collection efficiency of particulate materials, thereby enabling thinness and high-efficient configuration of the filter. The invention relates to a filter device, in which a single filter member can be divided into plural filter regions by means of the partitions, each of which is treated with various catalysts and installed in the filter member, thereby enabling to remove various gases included in the exhaust gas. The invention relates to a filter device for reducing automobile exhaust fume, which includes a metallic foam filter having a laminated type or a rolled-up type and an exhaust gas flow passageway having an inward type or an outward type, thereby improving collection efficiency. The invention relates to a filter device for reducing automobile exhaust fume, in which small and large grooves are formed in the surface of a rear flange such that the protruded grooves enable to easily hold the position of a tube when fastened with a porous tube at the side of an inlet port, thereby decreasing defective products in the manufacturing process. The invention relates to a filter device for reducing automobile exhaust fume, in which a serrated groove formed in the rear flange reduces deformation due to high-temperature during a welding between the inlet port tube and the flange, thereby maintaining the evenness of the flange surface. The invention relates to a filter device for reducing automobile exhaust fume, in which the front flange is welded with the porous tube at the side of the inlet port such that the front flange and the porous tube at the side of the inlet port are in parallel to each other, thereby propagating the welding heat in the lengthwise of the porous tube at the side of the inlet port and thus limiting the deformation due to heat transfer to the direction vertical to the flange plane to minimize thermal deformation of the flange plane. The invention relates to a filter device for reducing automobile exhaust fume, in which the porous tube at the side of the inlet port is formed with a vent hole having a rectangular or diamond shape to minimize vibration and deformation due to internal and external forces while obtaining a maximum flow area. The invention relates to a filter device for reducing automobile exhaust fume, in which the metallic foam filter disposed inside the filter device is wrapped around by a porous jacket or a metallic mat to maintain the initial shape of the metallic foam filter, thereby improving the durability of the filter device and securing a flow area.

BACKGROUND ART

In general, automobile exhaust gas is described by a gas that is discharged to the atmosphere through an exhaust pipe after a gasoline-air mixture is combusted in an engine. This exhaust gas includes harmful materials such as mainly carbon monoxide (CO), nitrogen oxide (NOx), un-combusted hydrocarbon (HC) and the like. Emission and exhaust regulations for controlling such exhaust gas become stricter and stricter. Accordingly, exhaust gas control devices such as an exhaust gas recirculation device, a tertiary catalyst, a MPI device and the like, and vapor gas control devices such as a canister, a purge control solenoid value and the like are applied to automobiles.

On the other hand, in case of automobile equipped with a diesel engine, the exhaust gas includes a considerable amount of nitrogen oxides and particulate matters, rather than the case of a gasoline engine, notwithstanding that the diesel engine has a better fuel efficiency and horsepower. Since most of air is combusted enough under operational conditions of diesel engines, the diesel automobile exhausts a less amount of CO and HC, rather than in the gasoline engine. However, the diesel engine exhausts a larger amount of NOx and particulate matters (fume).

DISCLOSURE

Technical Problem

Accordingly, major target materials in the diesel engine exhaust and emission regulations include nitrogen oxide (NOx) and particulate matters (PM). Techniques for treating these materials have been concentrated on delayed timing of fuel-spraying, a decrease in the nitrogen oxide contents by exhaust gas recirculation, and improvement in the engine performance for reducing the particulate matters. That is, specific count-measures against the diesel engine emission and exhaust regulations are categorized into an engine improvement and post-treatment techniques. The engine improvement techniques include improvements in the fuel cylinder, the air-suction system (turbo-charger+intercooler), the fuel spraying system (electro-controlled high pressure fuel spray device), the exhaust gas recirculation device, and the like. In addition, the post-treatment techniques includes an oxidation catalyst for removing a high-boiling point hydrocarbon from particulate matters, DeNox catalyst for decomposing or reducing nitrogen oxide (NOx) under excessive oxygen atmosphere, a diesel particulate filter (hereinafter, referred to as DPF) for filtering particulate matter, and the like. Among these post-treatment techniques, a filter system for removing particulate matters (PM) has advantages of reducing the amount of particulate matters by reliably collecting exhaust fume. However, the particulate matters collected in the DPF increases over time, and thus the pressure of exhaust gas increases, which leads to a burden on the engine.

Accordingly, it is an important factor to the DPF performance to reduce the pressure of DPF itself and simultaneously to combust the collected particulate matters.

At present, silicon carbide (SiC) is drawing attention as a DPF material, considering thermal expansion by combustion of the collected particulate matters during reproduction and durability. As illustrated in FIGS. 1 and 2, silicon carbide is used to form a unit cell 110. The unit cells 110 are connected using an adhesive having similar constituents to the silicon carbide to form a DPF of desired size. Currently, this DPF 100 is manufactured into a desired size in such a manner to constitute unit cells 110 having an identical cell density and porosity. In case of such a DPF 100 having the same density and porosity, the size of the DPF 100 is determined depending upon the amount of particulate matter in order to collect the particulate matters exhausted from an engine. Thus, if the area of a DPF 100 is larger than the diameter of a gas exhaust pipe or the same as the diameter of the exhaust pipe, a very long DPF 100 is required, thereby increasing the pressure of the exhaust gas and thus being unable to operate the engine. Therefore, a DPF 100 larger than the diameter of an exhaust pipe is inevitably installed, in order to remove particulate matters while suppressing the increase in the pressure of the exhaust gas. For this reason, the flow of the exhaust gas tends to be concentrated in the central area of the DPF 100. Further, the particulate matters collected in the edge area thereof obstruct the flow of the exhaust gas when in a reproduction mode. Consequently, the function of the DPF 100 comes to be failed at some point to reduce the flow area of the exhaust gas and thus increase the pressure of the exhaust gas from the engine, which leads to a cause for engine failure.

Further, if reproduction occurs where particulate matters are overly collected, the DPF 100 can be destroyed due to a rapid increase in the temperature.

On the other hand, in case of a conventional radial metallic foam filter, if the exhaust gas is in-flown towards the inner pipe, a high pressure is exerted on the blocked rear end portion of the inner pipe to increase the flow rate at the rear end portion, and a low pressure is exerted on the front end portion of the inner pipe to decrease the flow rate at the front end portion. In this way, where the flow rate becomes different throughout the filter, a large amount of particulate matters are collected at the rear end portion of high flow rate and a less amount of particulate matters are collected in the front end portion for the same period of time because of the lower flow rate. In this case, if a reproduction occurs, the filter can be damaged or distorted due to the temperature gradient.

Furthermore, conventionally the surface of a rear flange is not formed with small and large grooves. Thus, when a porous tube at the side of the inlet port is connected, the position thereof cannot be easily held. In addition, since a porous jacket is not mounted, the shape, configuration and position of the filter cannot be maintained against the expanding force of the filter and also the flow area cannot be easily procured.

Technical Solution

Accordingly, the present invention has been made to solve the above-mentioned problems occurring in the conventional art, and a primary object of the present invention is to provide a filter device for reducing automobile exhaust fume, in which one or more partitions are used to expand a flow length of exhaust gas while not thickening the thickness of a filter and the exhaust gas passes a multi-layered filter to increase collection efficiency of particulate materials, thereby enabling thinness and high-efficient configuration of the filter.

Another object to the invention is to provide a filter device, in which a single filter member can be divided into plural filter regions by means of the partitions, each of which is treated with various catalysts and installed in the filter member, thereby enabling to remove various gases included in the exhaust gas.

Still another object to the invention is to provide a filter device for reducing automobile exhaust fume, which includes a metallic foam filter having a laminated type or a rolled-up type and an exhaust gas flow passageway having an inward type or an outward type, thereby improving collection efficiency.

Yet another object to the invention is to provide a filter device for reducing automobile exhaust fume, in which small and large grooves are formed in the surface of a rear flange such that the protruded grooves enable to easily hold the position of a tube when fastened with a porous tube at the side of an inlet port, thereby decreasing defective products in the manufacturing process.

A further object to the invention is to provide a filter device for reducing automobile exhaust fume, in which a serrated groove formed in the rear flange reduces deformation due to high-temperature during a welding between the inlet port tube and the flange, thereby maintaining the evenness of the flange surface.

A still further object to the invention is to provide a filter device for reducing automobile exhaust fume, in which the front flange is welded with the porous tube at the side of the inlet port such that the front flange and the porous tube at the side of the inlet port are in parallel to each other, thereby propagating the welding heat in the lengthwise of the porous tube at the side of the inlet port and thus limiting the deformation due to heat transfer to the direction vertical to the flange plane to minimize thermal deformation of the flange plane.

A yet further object to the invention is to provide a filter device for reducing automobile exhaust fume, in which the porous tube at the side of the inlet port is formed with a vent hole having a rectangular or diamond shape to minimize vibration and deformation due to internal and external forces while obtaining a maximum flow area.

Another further object to the invention is to provide a filter device for reducing automobile exhaust fume, in which the metallic foam filter disposed inside the filter device is wrapped around by a porous jacket or a metallic mat to maintain the initial shape of the metallic foam filter, thereby improving the durability of the filter device and securing a flow area.

To accomplish the above object of the present invention, according to one aspect of the invention, there is provided a filter device for reducing automobile exhaust fume. The filter device comprises: a case including an inlet port, a porous tube and an exhaust port, a combusted exhaust gas flowing into the porous tube having a pipe shape from an engine, the porous tube being formed with a plurality of vent holes through which the exhaust gas is discharged after passing through a metallic foam filter in such a way as to obtain a maximum flow area and simultaneously minimize vibration and deformation by an external force, the exhaust gas being discharged through the exhaust port after passing through the porous tube and a flow passageway; a front flange mounted inside the case, the front flange being vertically fixed to the metallic foam filter wrapping around the porous tube to hold the porous tube and prevent the metallic foam filter from being pushed towards the front end, the front flange being welded with the porous tube at the side of the inlet port such that the front flange and the porous tube at the side of the inlet port are in parallel to each other, thereby propagating the welding heat in the lengthwise of the porous tube at the side of the inlet port, the deformation due to heat transfer being limited to the direction vertical to the flange plane to thereby minimize thermal deformation of the flange plane; a rear flange mounted inside the case, the rear flange being vertically fixed to the rear end of the metallic foam filter wrapping around the porous tube to thereby hold the porous tube and prevent the metallic foam filter from being pushed toward the rear end, the rear flange being formed with small and large grooves protruding on the surface of the rear flange in order to easily position the position of the porous tube by the protruded grooves when fastened with the porous tube at the side of the inlet port, the rear flange being formed with a serrated groove in such a way as to reduce deformation due to a high temperature heat generated when the rear flange is welded to the porous tube at the side of the inlet port, thereby maintaining the evenness of the surface of the rear flange; and a filter member including a laminated-type or rolled-up type metallic foam filter mounted between the front and rear flanges, and a jacket wrapped around the metallic foam filter, the exhaust gas that flows inside the porous tube passing through the metallic foam filter, the jacket wrapping around the metallic foam filter being formed in a network form to maintain the shape of the metallic foam filter and provide durability thereto, the jacket being formed with a rectangular vent hole and wrapping around and holding the metallic foam filter such that the shape, construction and position of the metallic foam filter can be maintained against an expanding force of the foam filter while securing a flow area.

In an embodiment, the jacket can be replaced with a metallic mat being formed in a network form wrapping around the metallic foam filter to thereby maintain the initial shape of the metallic foam filter and provide durability thereto.

In an embodiment, the filter device further comprises one or more partitions formed inside the case, the one or more partitions changing the flow line of the exhaust gas such that the exhaust gas in-flown through the inlet port passes through the metallic foam filter and then is discharged through the exhaust port.

In an embodiment, the front flange and the rear flange suppress and prevent a clearance between the metallic foam filter and the case, the case and the front flange or the rear flange, the front flange or the rear flange and the porous tube, and a welding plane of the front flange and the rear flange near a welding portion with the case is bent vertically to the front or rear flange plane so that the front flange or the rear flange can be easily assembled with the case and thermal deformation due to the welding can be deduced.

In an embodiment, the groove is placed in the inner side of rear flange and the groove includes one or more grooves, which prevent a clearance between the metallic foam filter and the case, the case and the front or rear flange, and the front or rear flange and the porous tube, which may be caused by thermal deformation.

In an embodiment, the jacket is perforated in a square shape using a press die, and thereafter wrapped around the filter in such a way as to cover it, the remaining area except for the hole is bent and a curring and folding are performed to fix it, or a welding is performed to fix it, thereby obtaining a maximum flow area.

In an embodiment, the flow passageway includes an outward type and an inward type, wherein in the outward type, the exhaust gas flows into the filter member and is discharged to the outside after passing through the filter member and then turned into the inside thereof again, and in the inward type, the exhaust gas flows from outside of the filter member into inside of the filter member via the filter member, again to the outside of the filter member and then again to the inside of the filter member.

In an embodiment, the filter member is divided into plural filter regions by means of the partitions, each of which is treated with various catalysts and installed in the filter member, thereby enabling to remove various gases included in the exhaust gas.

Advantageous Effects

According to the filter device for reducing automobile exhaust fume as described above, one or more partitions are used to expand a flow length of exhaust gas while not thickening the thickness of a filter and the exhaust gas passes a multi-layered filter to increase collection efficiency of particulate materials, thereby enabling thinness and high-efficient configuration of the filter. A single filter member can be divided into plural filter regions by means of the partitions, each of which is treated with various catalysts and installed in the filter member, thereby enabling to remove various gases included in the exhaust gas. The filter device includes a metallic foam filter having a laminated type or a rolled-up type and an exhaust gas flow passageway having an inward type or an outward type, thereby improving collection efficiency. Small and large grooves are formed in the surface of a rear flange such that the protruded grooves enable to easily hold the position of a tube when fastened with a porous tube at the side of an inlet port, thereby decreasing defective products in the manufacturing process. A serrated groove formed in the rear flange reduces deformation due to high-temperature during a welding between the inlet port tube and the flange, thereby maintaining the evenness of the flange surface. The front flange is welded with the porous tube at the side of the inlet port such that the front flange and the porous tube at the side of the inlet port are in parallel to each other, thereby propagating the welding heat in the lengthwise of the porous tube at the side of the inlet port and thus limiting the deformation due to heat transfer to the direction vertical to the flange plane to minimize thermal deformation of the flange plane. The porous tube at the side of the inlet port is formed with a vent hole having a rectangular or diamond shape to minimize vibration and deformation due to internal and external forces while obtaining a maximum flow area. The metallic foam filter disposed inside the filter device is wrapped around by a porous jacket or a metallic mat to maintain the initial shape of the metallic foam filter, thereby improving the durability of the filter device and securing a flow area.

DESCRIPTION OF DRAWINGS

Further objects and advantages of the invention can be more fully understood from the following detailed description taken in conjunction with the accompanying drawings, in which:

FIG. 5 illustrates a structure of a rear flange that constitutes a filter member in a filter device for reducing automobile exhaust fume, according to an embodiment of the invention;

FIG. 6 illustrates configurations of a porous tube and perforated metal plate that constitute a filter member in a filter device for reducing automobile exhaust fume, according to an embodiment of the invention;

BEST MODE

Hereinafter, a preferred embodiment of the invention will be explained in detail with reference to the accompanying drawings. In the explanation of embodiments, details well-known in the art and not related directly to the invention may be omitted to avoid unnecessarily obscuring the invention and convey the gist of the invention more clearly. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. Thus, such a special definition will be expressly set forth in the specification in a definitional manner that directly and unequivocally provides the special definition for the term or phrase.

Figure 1:
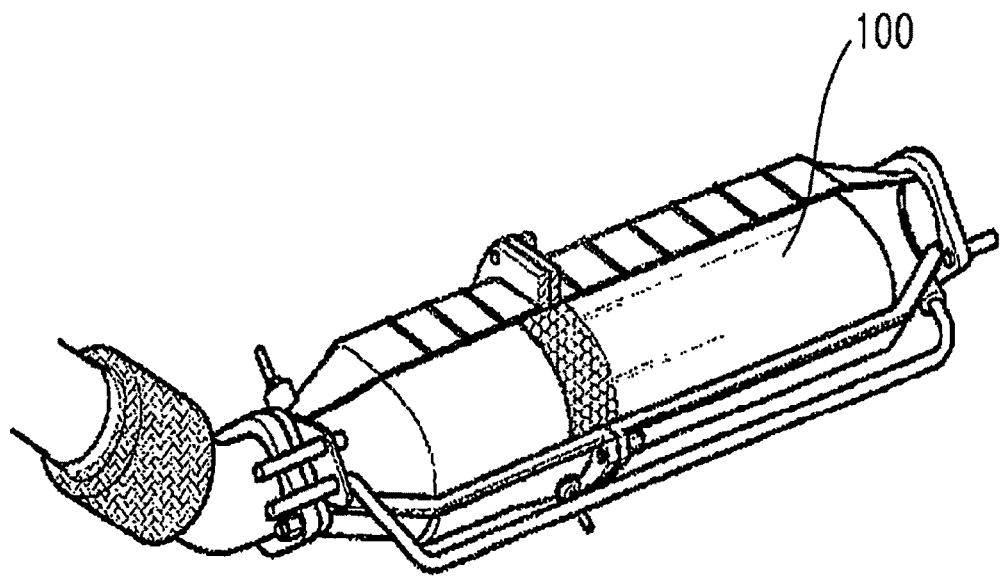
FIG. 1 illustrates a conventional filter system for removing particulate materials in a diesel engine.
Figure 2:
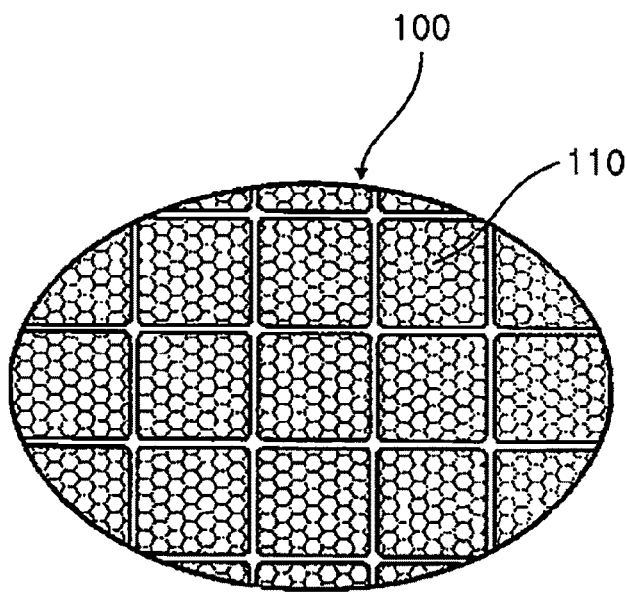
FIG. 2 illustrates a conventional filter system for removing particulate materials in a diesel engine.
Figure 3:
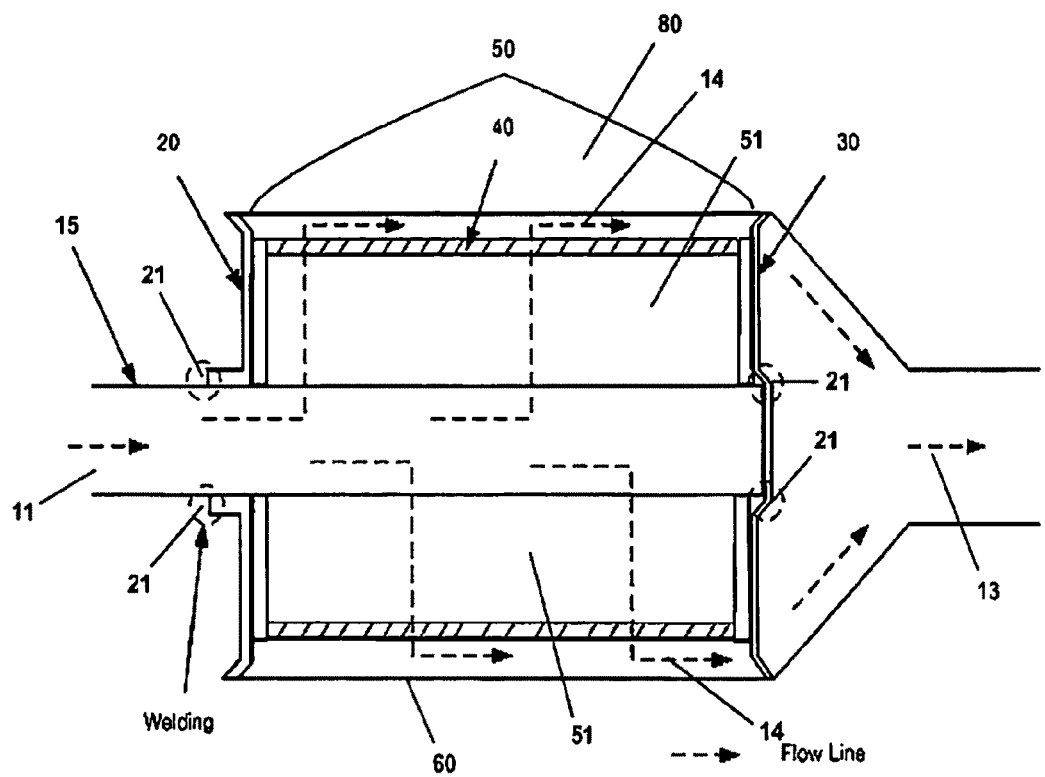
FIG. 3 illustrates a configuration for suppressing deformation of a filter member in a filter device for reducing automobile exhaust fume, according to an embodiment of the invention.
Figure 4:
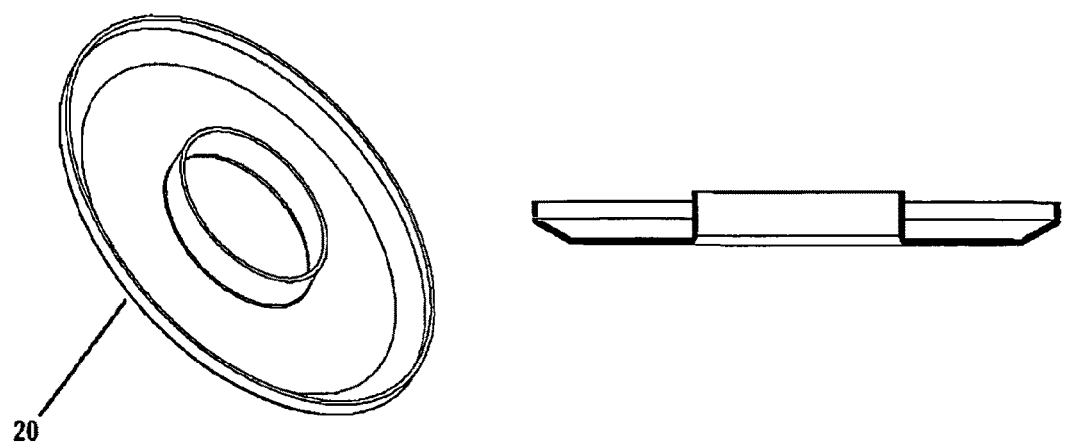
FIG. 4 illustrates a structure of a front flange that constitutes a filter member in a filter device for reducing automobile exhaust fume, according to an embodiment of the invention.
Figure 7:
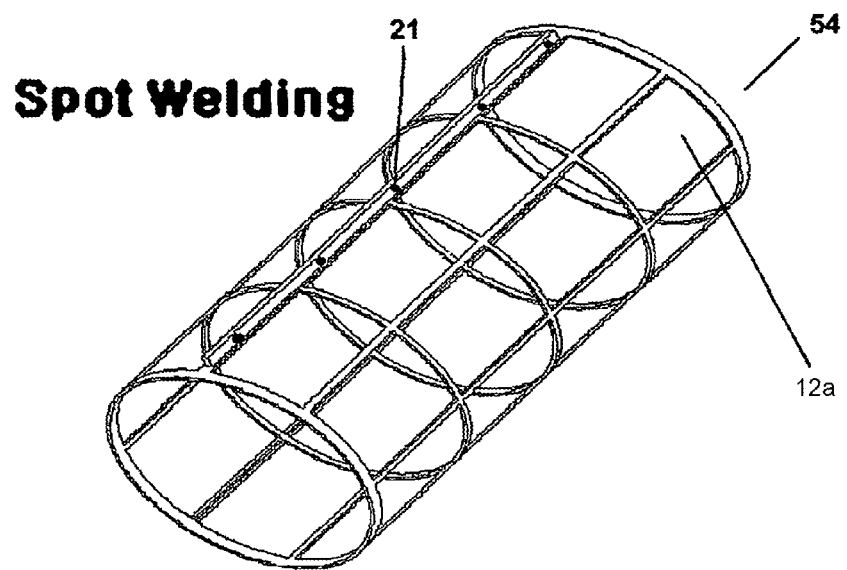
FIG. 7 illustrates a jacket and a fastening structure thereof that constitutes a filter member in a filter device for reducing automobile exhaust fume, according to an embodiment of the invention.
Figure 8:
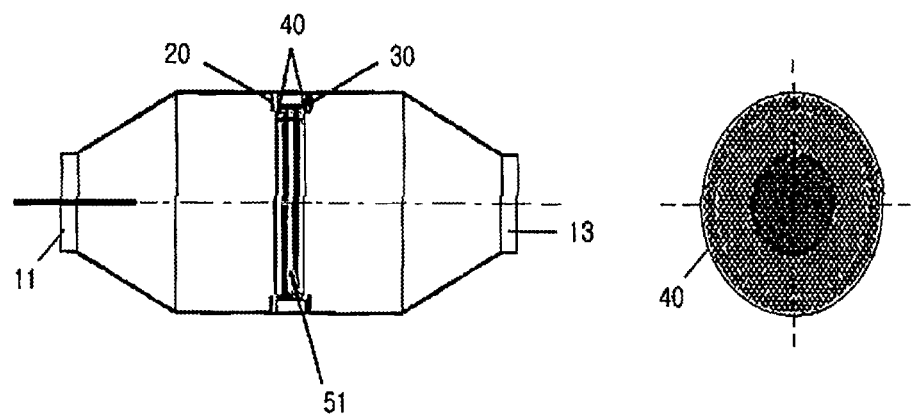
FIG. 8 illustrates a metallic mat and a mounting structure thereof that constitute a filter member in a filter device for reducing automobile exhaust fume, according to an embodiment of the invention.
Figure 9:
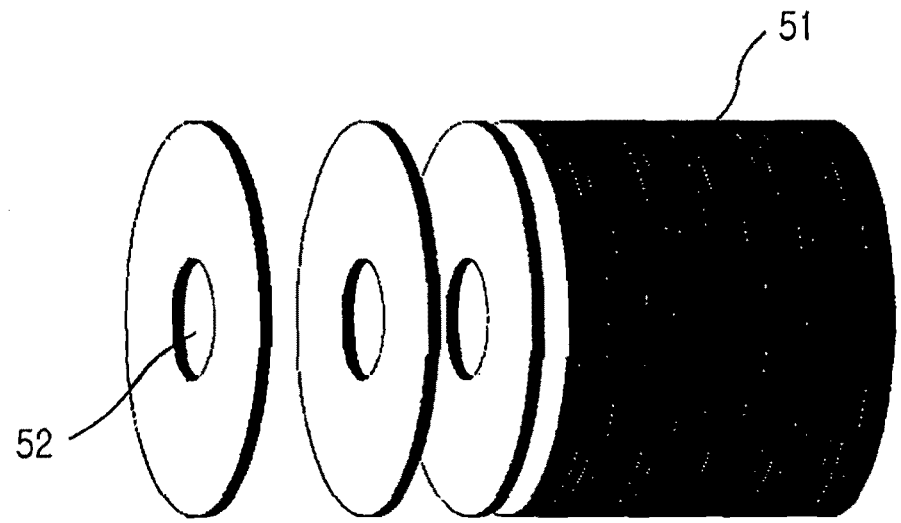
FIG. 9 illustrates a configuration of a laminated metallic foam filter that constitutes a filter member in a filter device for reducing automobile exhaust fume, according to an embodiment of the invention.
Figure 10:
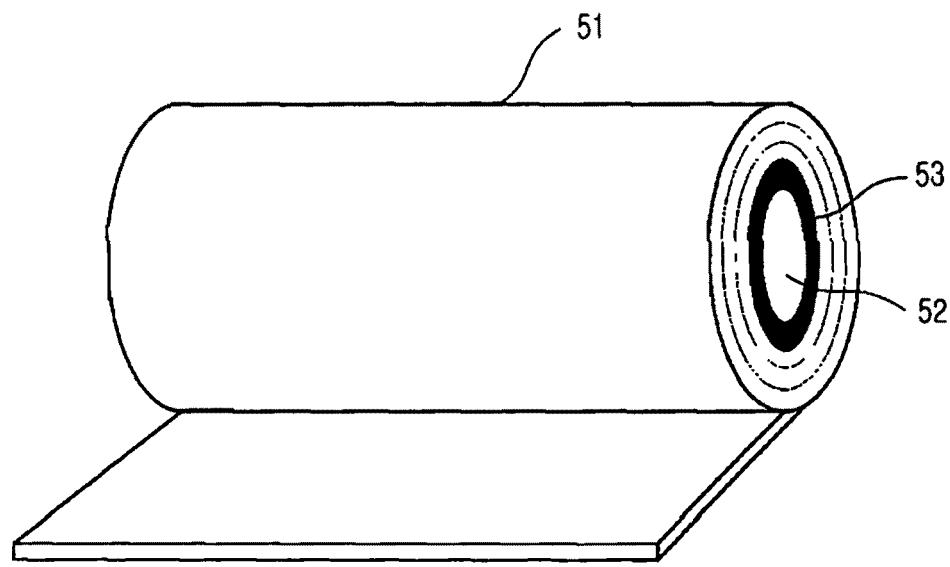
FIG. 10 illustrates a configuration of a rolled-up metallic foam filter that constitutes a filter member in a filter device for reducing automobile exhaust fume, according to an embodiment of the invention.
Figure 11:
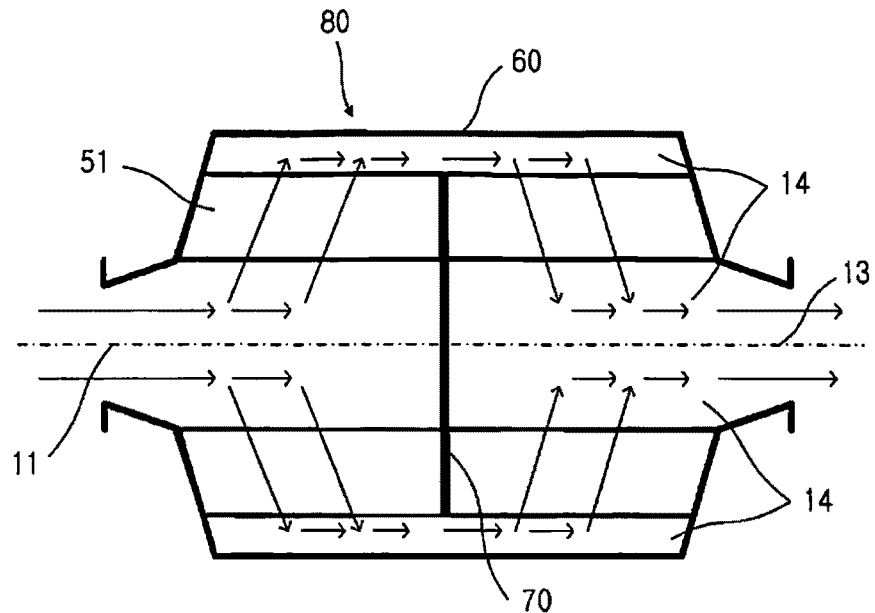
FIG. 11 illustrates a filter device for reducing automobile exhaust fume where an exhaust gas passageway having a single partition is formed in a combination of inward type and outward type.
Figure 12:
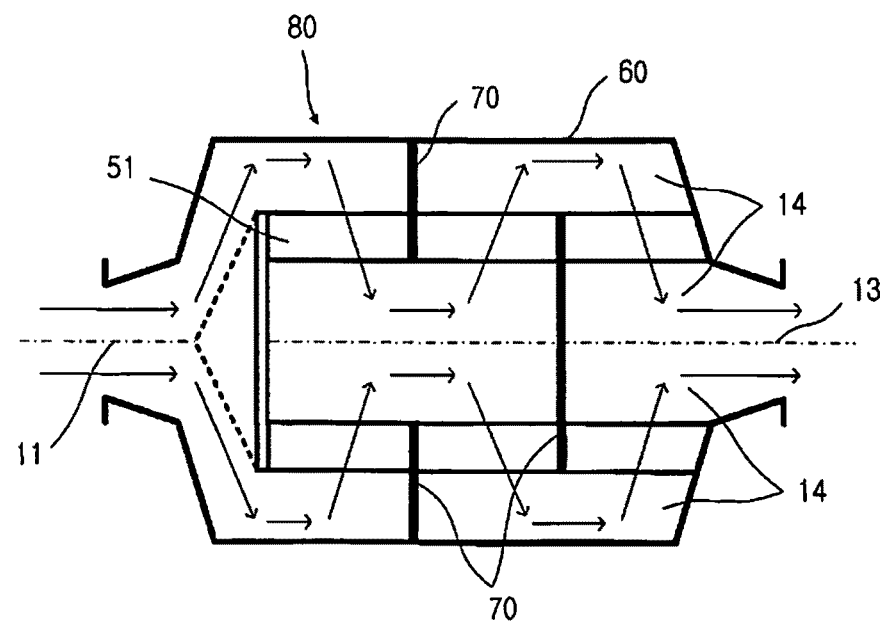
FIG. 12 illustrates a filter device for reducing automobile exhaust fume where an exhaust gas passageway having a single partition is formed in a combination of inward type and outward type.

FIG. 3 illustrates a configuration for suppressing deformation of a filter member in a filter device for reducing automobile exhaust fume, according to an embodiment of the invention. FIG. 4 illustrates a structure of a front flange that constitutes a filter member in a filter device for reducing automobile exhaust fume, according to an embodiment of the invention. FIG. 5 illustrates a structure of a rear flange that constitutes a filter member in a filter device for reducing automobile exhaust fume, according to an embodiment of the invention. FIG. 6 illustrates configurations of a porous tube and perforated metal plate that constitute a filter member in a filter device for reducing automobile exhaust fume, according to an embodiment of the invention. FIG. 7 illustrates a jacket and a fastening structure thereof that constitutes a filter member in a filter device for reducing automobile exhaust fume, according to an embodiment of the invention. FIG. 8 illustrates a metallic mat and a mounting structure thereof that constitute a filter member in a filter device for reducing automobile exhaust fume, according to an embodiment of the invention. FIG. 9 illustrates a configuration of a laminated metallic foam filter that constitutes a filter member in a filter device for reducing automobile exhaust fume, according to an embodiment of the invention. FIG. 10 illustrates a configuration of a rolled-up metallic foam filter that constitutes a filter member in a filter device for reducing automobile exhaust fume, according to an embodiment of the invention. FIG. 11 illustrates a filter device for reducing automobile exhaust fume where an exhaust gas passageway having a single partition is formed in a combination of inward type and outward type. FIG. 12 illustrates a filter device for reducing automobile exhaust fume where an exhaust gas passageway having a single partition is formed in a combination of inward type and outward type.

Hereafter, preferred embodiments of the invention will be explained in detail, with reference to the drawings. In the drawings, like references denote like elements.

A filter device 80 for reducing automobile exhaust fume (hereinafter, referred to as a filter device) includes an inlet port 11, a vent hole, an exhaust port 13, a flow passageway 14, a porous tube 15, a front flange 20, a welding portion 21, a rear flange 30, a small groove 31a, a large groove 31b, a serrated groove 31c, a metallic mat 40, a filter member 50, a metallic foam filter 51, a through-hole 52, a holder 53, a jacket 54, a case 60, a partition 70 and the like.

As illustrated in FIGS. 3 to 12, the filter device 80 includes a case 60, a front flange 20 and a rear flange 30 mounted inside the case 60, and a filter member 50. The case 60 is formed with an inlet port 11, a porous tube 15 and an exhaust port 13. A combusted exhaust gas flows from an engine toward the porous tube 15 having pipe shape. The porous tube 15 is formed with a plurality of vent holes through which the exhaust gas is discharged after passing through a metallic foam filter 51, in such a way as to secure a maximum flow area and simultaneously minimize vibration and deformation by an external force. The exhaust gas is discharged through the exhaust port 13 after passing through the porous tube 15 and the flow passageway 14. The front flange 20 is mounted inside the case. The front flange is vertically fixed to a metallic foam filter 51 wrapping around the porous tube 15 to hold the porous tube 15 and prevent the metallic foam filter 51 from being pushed towards the front end. The front flange 20 is welded with the porous tube 15 at the side of the inlet port such that the front flange 20 and the porous tube 15 at the side of the inlet port are in parallel to each other, thereby propagating the welding heat in the lengthwise of the porous tube at the side of the inlet port. Thus, the deformation due to heat transfer is limited to the direction vertical to the flange plane to thereby minimize thermal deformation of the flange plane. The rear flange 30 is mounted inside the case. The rear flange 30 is vertically fixed to the rear end of the metallic foam filter 51 wrapping around the porous tube 15 to thereby hold the porous tube 15 and prevent the metallic foam-filter 51 from being pushed toward the rear end. The rear flange 30 is formed with small grooves 31a and large grooves 31b protruding on the surface of the rear flange 30 in order to easily position the position of the porous tube 15 by the protruded small and large grooves 31a, 31b when fastened with the porous tube 15 at the side of the inlet port. The rear flange 30 is formed with a serrated groove 31c in such a way as to reduce deformation due to a high temperature heat generated when the rear flange is welded to the porous tube 15 at the side of the inlet port, thereby maintaining the evenness of the surface of the rear flange 30. The filter member 50 includes a laminated-type or rolled-up type metallic foam filter 51 mounted between the front and rear flanges 20 and 30, and a jacket 54 wrapped around the metallic foam filter 51. The exhaust gas that flows inside the porous tube 15 passes through the metallic foam filter 51. The jacket 54 wrapping around the metallic foam filter is formed in a network form to maintain the shape of the metallic foam filter and provide durability thereto. The jacket 54 is formed with a rectangular vent hole 12a and wraps around and hold the metallic foam filter 51 such that the shape, construction and position of the metallic foam filter can be maintained against an expanding force of the foam filter while securing a flow area.

Referring to FIGS. 3 to 12, major technical features of the filter device according to an embodiment of the invention will be explained hereafter.

The case 60 is formed with an inlet tube 11, a porous tube 15 and an exhaust port 13. Combusted exhaust gas flows into the porous tube 15 of pipe shape from an engine. The porous tube 15 is formed with a plurality of vent holes through which the exhaust gas is discharged after passing through a metallic foam filter 51, in such a way as to secure a maximum flow area and simultaneously minimize vibration and deformation by an external force. The exhaust gas is discharged through the exhaust port 13 via the flow passageway 14 after passing through the porous tube 15. The porous tube 15 is formed of a metallic material. As illustrated in FIG. 6, in one embodiment the porous tube 15 comprises porous tube 15a, which is formed with a plurality of rectangular vent holes 12a; in another embodiment the porous tube 15 comprises porous tube 15b, which is formed with a plurality of polygonal vent holes 12b.

As illustrated in FIGS. 3 and 6, the porous tube 15 is perforated in a rectangular or diamond shape using a press die, thereby obtaining a larger flow area, i.e., a large of surface porosity. The number of perforated holes varies with vibration and external force exerted on the porous tube 15, and can provide a porosity ratio of 60 to 90%. Thus, due to the larger flow area, a low pressure drop occurs, and vibration or deformation caused by external forces can be prevented when it is connected to other elements such as the front flange 20 and rear flange 30, thereby enabling to obtain products having a high durability.

The front flange 20 is mounded inside of the case 60. The front flange 20 is fixed vertically to the front end of the metallic foam filter 51 wrapping around the porous tube 15, thereby holding the porous tube 15 and preventing the metallic foam filter 51 from being pushed toward the front end.

As illustrated in FIGS. 3 and 4, the front flange 20 is welded with the porous tube 15 at the side of the inlet port such that the front flange 20 and the porous tube 15 at the side of the inlet port are in parallel to each other, thereby propagating the welding heat in the lengthwise of the porous tube 15 at the side of the inlet port. Thus, the deformation due to heat transfer is limited to the direction vertical to the flange plane to thereby minimize thermal deformation of the flange plane. Accordingly, deformation due to the heat transfer is restricted to the direction vertical to the plane of the front flange to thereby minimize thermal deformation of the plane of the front flange. Thus, clearance between the metallic foam filter 51 and the case 60, the case 60 and the front flange 20, and the front flange 20 and the porous tube 15 can be suppressed and prevented. In addition, a welding portion 21 where the case 60 is welded is bent vertically to the front flange so that the front flange can be easily assembled to the case and thermal deformation dm to welding can be minimized.

The rear flange 30 is mounted inside of the case. The rear flange 30 is fixed vertically to the rear end of the metallic foam filter 51 wrapping around the porous tube 15, thereby holding the porous tube 15 in place and preventing the metallic foam filter 51 from being pushed toward the rear end.

As illustrated in FIGS. 3 and 5, the rear flange 30 is formed with small grooves 31a and large grooves 31b protruding on the surface of the rear flange 30 such that the porous tube 15 can be easily positioned by the protruded small and large grooves 31a, 31b when it is fastened with the porous tube 15 at the side of the inlet port. The rear flange 30 is formed with a serrated groove 31c in such a way as to reduce deformation due to a high temperature heat generated when the rear flange is welded to the porous tube 15 at the side of the inlet port, thereby maintaining the evenness of the surface of the rear flange 30. The small grooves 31a, large grooves 31b, and serrated groove 31c are collectively referred to here and in the drawings as grooves 31. The position, shape or number of the grooves 31 is determined by the high-temperature welding environment to which the filter device is exposed. The grooves 31 are placed at the inner side of the rear flange and the number of the grooves may be in a range of one to several tens. Further, the reduction in the thermal deformation can suppress and prevent a clearance between the metallic foam filter 51 and the case 60, the case 60 and the rear flange 30, and the rear flange 30 and the porous tube 15, which may be caused by thermal deformation.

The filter member 50 is mounted between the front flange 20 and the rear flange 30. The filter member 50 includes a laminated-type or rolled-up type metallic foam filter 51 mounted between the front and rear flanges 20 and 30, and a jacket 54 wrapped around the metallic foam filter 51. The exhaust gas that flows into the porous tube 15 passes through the metallic foam filter 51. The jacket 54 wrapping around the metallic foam filter 51 is formed in a network form to thereby maintain the shape of the metallic foam filter and provide durability thereto. The jacket 54 is formed with a rectangular vent hole 12a and wraps around and hold the metallic foam filter 51 such that the shape, construction and position of the metallic foam filter can be maintained against an expanding force of the foam filter while securing a flow area. Here, the jacket 54 may also be formed with a diamond shape vent hole 12b.

The metallic foam filter 51 wraps around the porous tube 15 in a laminated or rolled-up structure. An exhaust gas that flows into the porous tube 15 passes through the metallic foam filter 51. The metallic foam filter 51 is mounted between one or plural partitions in such a way as to be vertically laminated in plural. Thus, effective contact area can be enlarged and the flow length of the exhaust gas can be lengthened within a limited space.

As illustrated in FIGS. 9 and 10, the metallic foam filter 51 disposed inside the filter member 50 is formed in a laminated structure or a rolled-up structure. The laminated structure is formed in such a manner that a through-hole 52 is formed in the center of a nickel foam and these nickel foams are stacked and pressure-canned. The rolled-up structure is formed in such a way that a nickel alloy foam is wrapped around a holder 53. The porosities in the surface and the side face of metal alloy are usually similar, but the pore size in the side face is about 50% of that of the surface thereof such that the pore is smaller, but the porosity is the same, thereby enabling to enhance the efficiency of collection. The metal alloy forming the metallic foam filter 41 has a surface pore having a size of 200 to 2500 μm and the porosity of 88±8%. In addition, the metallic foam filter 51 is formed of an alloy of Ni—Cr—Fe.

The partition 70 is mounted inside of the case 60 in such a way that the exhaust gas flowing into the inlet port is discharged after passing through the filter. The partition 70 may include a single partition or a plurality of partitions, depending upon the characteristics of flow line and the environment of use. Thus, an initial effective contact area can be enlarged and thus an exhaust pressure can be lowered. In addition, the length along which the exhaust gas passes through the metallic foam filter can be further lengthened, thereby enabling to improve the efficiency of collection. Furthermore, in case where plural partitions 70 are installed in a single filter member 50, the filter member can be divided into plural filters, each of which can be treated with various catalysts, thereby enabling to remove various gases included in the exhaust gas.

The jacket 54 is mounted between the front flange 20 and the rear flange 30. The jacket 54 is formed in a network shape and wraps around the metallic foam filter 51, thereby maintaining the shape of the metallic foam filter 51 and providing durability thereto.

As illustrated in FIGS. 3 and 7, in order for the jacket 54 to be wrapped around the entire metallic foam filter 51, the jacket 54 is mounted in such a way as to wrap around the entire portion between the front flange 20 and the rear flange 30. In addition, it is most desirable that the jacket 54 is formed with a rectangular vent hole 12a, but the jacket 54 may also be formed with a diamond-shaped vent hole 12b. Further, the jacket 54 wraps around and holds the metallic foam filter 51 such that the shape, construction and position of the metallic foam filter can be maintained against an expanding force of the foam filter while securing a flow area. In order to secure a maximum flow area, the jacket 54 is perforated in a square shape using a press die, and thereafter wrapped around the filter in such a way as to cover it. The remaining area except for the hole is bent and a curring and folding are performed to fix it or a welding is performed to fix it. Accordingly, due to a larger flow area, a low pressure drop occurs. Due to the curring and folding for fixing or welding, the jacket 54 is tightly contacted with the filter, and thus the shape, configuration and position of the filter can be maintained against the expanding force of the filter in the periodic heating and cooling environment where the filter is exposed during collection or reproduction.

As illustrated in FIG. 8, the metallic foam filter 51 may include a metallic mat 40, which is formed in a network form wrapping around the metallic foam filter 51, thereby maintaining the original shape of the metallic foam filter 51 and providing durability thereto. The metallic mat 40 is mounted in the front and rear face to wrap around both sides of the metallic foam filter 51.

Further, the flow passageway 14 is formed inside of the case 60. Exhaust gas flowing into the inlet port 11 passes through the metallic foam filter 51 via the flow passageway and is discharged through the exhaust port 13.

As shown in FIGS. 11 and 12, the flow passageway 40 includes an outward type and an inward type. In the outward type, the exhaust gas flows into the filter member 50 and is discharged to the outside after passing through the filter member and then turned into the inside thereof again. In the inward type, the exhaust gas flows from outside of the filter member 50 into inside of the filter member via the filter member, again to the outside of the filter member and then again to the inside of the filter member. After that, the exhaust gas is discharged to the outside of the case 60. FIGS. 11 and 12 illustrate a combination type including both the outward type and the inward type. In case of the outward type, the filter member 50 and the case 60 are fastened using welding, cock'g, brazing, bolt-fastening or clearance fitting, to prevent the exhaust gas from leaking without passing through the filter member 50. The partition 70 is supported at the filter member 50 or the case 60 to block flow of the exhaust gas. Further, the inward type is to be configured in a way of welding, cock'g, brazing, bolt-fastening and clearance fitting so as not to cause leak from the flow passageway 14, i.e., from each elements. The partition 70 disposed in the boundary of each filter region may be structured to be supported inside the filter member 40 or the case, as illustrated in FIG. 11.

INDUSTRIAL APPLICABILITY

According to the filter device for reducing automobile exhaust fume as described above, one or more partitions are used to expand a flow length of exhaust gas while not thickening the thickness of a filter and the exhaust gas passes a multi-layered filter to increase collection efficiency of particulate materials, thereby enabling thinness and high-efficient configuration of the filter. A single filter member can be divided into plural filter regions by means of the partitions, each of which is treated with various catalysts and installed in the filter member, thereby enabling to remove various gases included in the exhaust gas. The filter device includes a metallic foam filter having a laminated type or a rolled-up type and an exhaust gas flow passageway having an inward type or an outward type, thereby improving collection efficiency. Small and large grooves are formed in the surface of a rear flange such that the protruded grooves enable to easily hold the position of a tube when fastened with a porous tube at the side of an inlet port, thereby decreasing defective products in the manufacturing process. A serrated groove formed in the rear flange reduces deformation due to high-temperature during a welding between the inlet port tube and the flange, thereby maintaining the evenness of the flange surface. The front flange is welded with the porous tube at the side of the inlet port such that the front flange and the porous tube at the side of the inlet port are in parallel to each other, thereby propagating the welding heat in the lengthwise of the porous tube at the side of the inlet port and thus limiting the deformation due to heat transfer to the direction vertical to the flange plane to minimize thermal deformation of the flange plane. The porous tube at the side of the inlet port is formed with a vent hole having a rectangular or diamond shape to minimize vibration and deformation due to internal and external forces while obtaining a maximum flow area. The metallic foam filter disposed inside the filter device is wrapped around by a porous jacket or a metallic mat to maintain the initial shape of the metallic foam filter, thereby improving the durability of the filter device and securing a flow area.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A filter device for reducing automobile exhaust fume, the filter device comprising:

a case including an inlet port, a porous tube and an exhaust port, a combusted exhaust gas flowing into the porous tube having a pipe shape from an engine, the porous tube being formed with a plurality of vent holes through which the exhaust gas is discharged after passing through a metallic foam filter in such a way as to obtain a maximum flow area and simultaneously minimize vibration and deformation by an external force, the exhaust gas being discharged through the exhaust port after passing through the porous tube and a flow passageway;

a front flange mounted inside the case, the front flange being vertically fixed to the metallic foam filter wrapping around the porous tube to hold the porous tube and prevent the metallic foam filter from being pushed towards the front end, the front flange being welded with the porous tube at the side of the inlet port such that the front flange and the porous tube at the side of the inlet port are in parallel to each other, thereby propagating the welding heat in the lengthwise of the porous tube at the side of the inlet port, the deformation due to heat transfer being limited to the direction vertical to the flange plane to thereby minimize thermal deformation of the flange plane;

a rear flange mounted inside the case, the rear flange being vertically fixed to the rear end of the metallic foam filter wrapping around the porous tube to thereby hold the porous tube and prevent the metallic foam filter from being pushed toward the rear end, the rear flange being formed with small and large grooves protruding on the surface of the rear flange in order to easily position the position of the porous tube by the protruded grooves when fastened with the porous tube at the side of the inlet port, the rear flange being formed with a serrated groove in such a way as to reduce deformation due to a high temperature heat generated when the rear flange is welded to the porous tube at the side of the inlet port, thereby maintaining the evenness of the surface of the rear flange; and a filter member including a laminated-type or rolled-up type metallic foam filter mounted between the front and rear flanges, and a jacket wrapped around the metallic foam filter, the exhaust gas that flows inside the porous tube passing through the metallic foam filter, the jacket wrapping around the metallic foam filter being formed in a network form to maintain the shape of the metallic foam filter and provide durability thereto, the jacket being formed with a rectangular vent hole and wrapping around and holding the metallic foam filter such that the shape, construction and position of the metallic foam filter can be maintained against an expanding force of the foam filter while securing a flow area, wherein the jacket is perforated in a square shape using a press die, and thereafter wrapped around the filter in such a way as to cover it, the remaining area except for the hole is bent and a curring and folding are performed to fix it, or a welding is performed to fix it, thereby obtaining a maximum flow area.

2. The filter device according to claim 1, further comprising one or more partitions formed inside the case, the one or more partitions changing the flow line of the exhaust gas such that the exhaust gas in-flown through the inlet port passes through the metallic foam filter and then is discharged through the exhaust port.

3. The filter device according to claim 1, wherein the front flange and the rear flange suppress and prevent a clearance between the metallic foam filter and the case, the case and the front flange or the rear flange, the front flange or the rear flange and the porous tube, and a welding plane of the front flange and the rear flange near a welding portion with the case is bent vertically to the front or rear flange plane so that the front flange or the rear flange can be easily assembled with the case and thermal deformation due to the welding can be deduced.

4. The filter device according to claim 1, wherein the serrated groove is placed in the inner side of rear flange and wherein the serrated groove prevents a clearance between the metallic foam filter and the case, the case and the front or rear flange, and the front or rear flange and the porous tube, which may be caused by thermal deformation.

5. The filter device according to claim 1 or 2, wherein the flow passageway includes an outward type and an inward type, wherein in the outward type, the exhaust gas flows into the filter member and is discharged to the outside after passing through the filter member and then turned into the inside thereof again, and in the inward type, the exhaust gas flows from outside of the filter member into inside of the filter member via the filter member, again to the outside of the filter member and then again to the inside of the filter member.

6. The filter device according to claim 2, wherein the filter member is divided into plural filter regions by means of the partitions, each of which is treated with various catalysts and installed in the filter member, thereby enabling to remove various gases included in the exhaust gas.

* * * * *